US009083447B2

United States Patent
De Rivaz et al.

(10) Patent No.: US 9,083,447 B2
(45) Date of Patent: Jul. 14, 2015

(54) RECEIVER OF PULSES OF AN ULTRA WIDE BAND TYPE SIGNAL AND ASSOCIATED METHOD

(75) Inventors: Sébastien De Rivaz, Montmelian (FR); Manuel Pezzin, Grenoble (FR); Laurent Ouvry, Le Versoud (FR)

(73) Assignee: COMMISSARIAT A. L'ENERGIE ATOMIQUE, Paris (FR)

( * ) Notice: Subject to any disclaimer, the term of this patent is extended or adjusted under 35 U.S.C. 154(b) by 327 days.

(21) Appl. No.: 11/602,557

(22) Filed: Nov. 21, 2006

(65) Prior Publication Data

US 2007/0133720 A1    Jun. 14, 2007

(30) Foreign Application Priority Data

Nov. 23, 2005    (FR) ...................................... 05 11862

(51) Int. Cl.
| | |
|---|---|
| H03K 9/00 | (2006.01) |
| H04L 27/00 | (2006.01) |
| H04B 1/7183 | (2011.01) |
| H04B 1/7163 | (2011.01) |

(52) U.S. Cl.
CPC ............ *H04B 1/7183* (2013.01); *H04B 1/7163* (2013.01)

(58) Field of Classification Search
CPC ............................ H04B 1/7183; H04B 1/7163
USPC ........................... 375/239, 316, 324, 354, 355
See application file for complete search history.

(56) References Cited

U.S. PATENT DOCUMENTS

| | | | |
|---|---|---|---|
| 2002/0075972 A1 | 6/2002 | Richards et al. | |
| 2002/0110109 A1* | 8/2002 | Kawaguchi et al. | 370/342 |
| 2003/0086511 A1 | 5/2003 | Helal et al. | |

(Continued)

FOREIGN PATENT DOCUMENTS

| | | |
|---|---|---|
| EP | 1 298 811 A1 | 4/2003 |
| EP | 1 482 648 A1 | 12/2004 |

(Continued)

OTHER PUBLICATIONS

O'Donnel et al., "An Integrated, Low Power, Ultra-Wideband Transceiver Architecture for Low-Rate, Indoor Wireless Systems", WCNC. IEEE Wireless Communications and Networking Conference, Sep. 4, 2002, pp. 1-8.*

(Continued)

*Primary Examiner* — Freshten N Aghdam
(74) *Attorney, Agent, or Firm* — Brinks Gilson & Lione

(57) ABSTRACT

A receiver of electromagnetic and a method for receiving electromagnetic signals transmitted in a frequency band having a predetermined upper limit $f_{MAX}$ and representing a stream of information by means of a modulation of pulses at a predetermined average pulse repetition frequency $f_{PRP}$. The receiver includes an input stage including a band-pass filter and applys processing without changing frequency of the signals and a sampler of the processed signals operating at a sampling frequency $f_e$ that is an integer multiple of the average pulse repetition frequency $f_{PRP}$ and less than said upper limit $f_{MAX}$.

20 Claims, 3 Drawing Sheets

(56) References Cited

U.S. PATENT DOCUMENTS

| | | | |
|---|---|---|---|
| 2004/0062325 A1* | 4/2004 | England et al. ............... | 375/340 |
| 2005/0041725 A1 | 2/2005 | De Rivaz et al. | |
| 2005/0239432 A1* | 10/2005 | Wilcox ......................... | 455/334 |
| 2006/0215779 A1* | 9/2006 | Shiina .......................... | 375/260 |
| 2007/0115160 A1* | 5/2007 | Kleveland et al. ............ | 341/144 |
| 2007/0133863 A1* | 6/2007 | Sakai et al. ................... | 382/151 |
| 2009/0257528 A1* | 10/2009 | Schell .......................... | 375/302 |
| 2010/0014705 A1* | 1/2010 | Gustafson et al. ............ | 382/100 |

FOREIGN PATENT DOCUMENTS

| | | |
|---|---|---|
| GB | 2 229 055 A | 9/1990 |
| WO | WO 01/76086 A2 | 10/2001 |

OTHER PUBLICATIONS

Pezzin M. et al, "Ultra Wideband: the radio link of the future?", Annals of Telecommunications, Get Lavoisier, Paris, FR, vol. 58, No. 3/4, Mar. 2003.

O'Donnel 1 et al., "An Integrated, Low Power, Ultra-Wideband Transceiver Architecture for Low-Rate, Indoor Wireless Systems", WCNC. IEEE Wireless Communications and Networking Conference, Sep. 4, 2002, pp. 1-8.

Search Report for French Application No. 0511862 dated Aug. 9, 2006.

"Optimal and Suboptimal Receivers for Ultra-wideband Transmitted Reference Systems," Yi-Ling Chao and Robert A. Scholtz.

\* cited by examiner

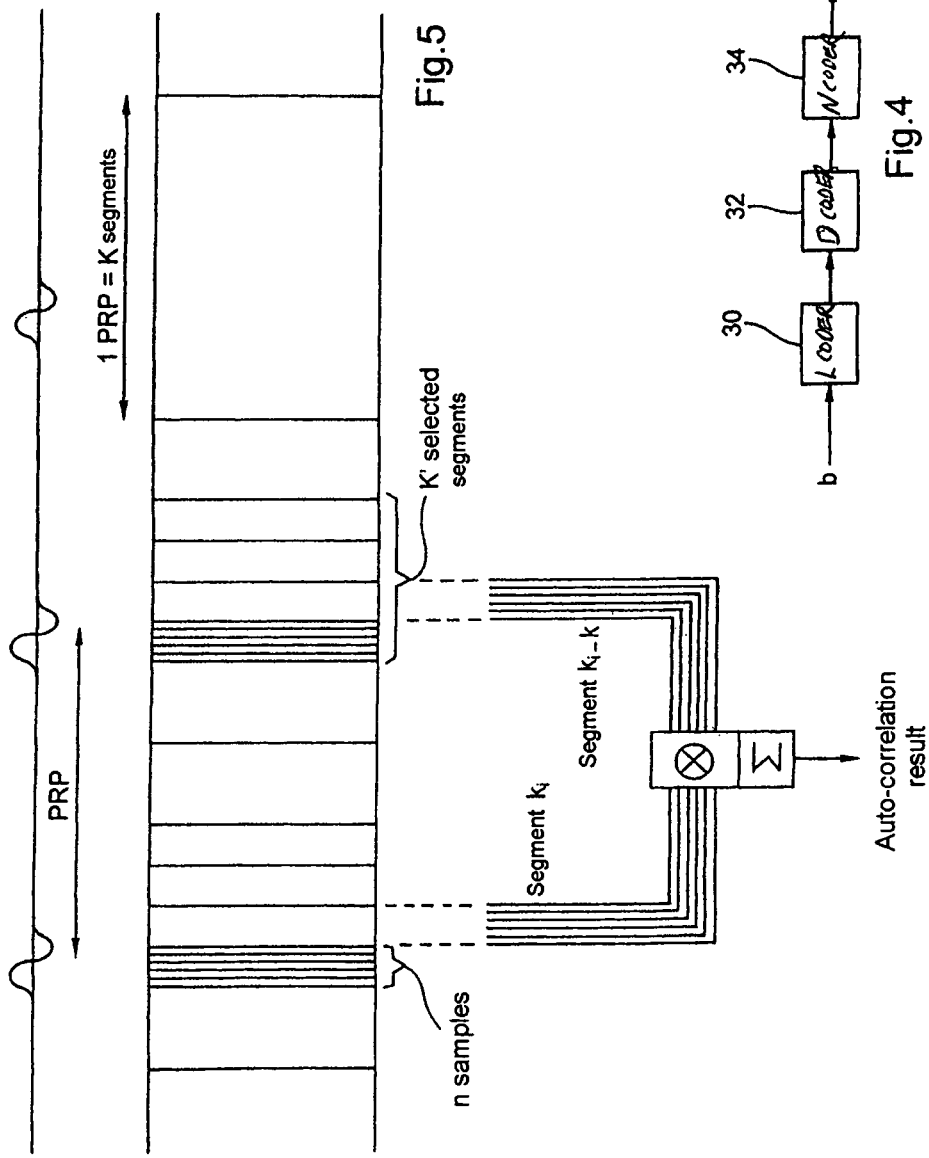

RECEIVER OF PULSES OF AN ULTRA WIDE BAND TYPE SIGNAL AND ASSOCIATED METHOD

PRIORITY CLAIM

Priority is claimed to French patent application no. 0511862, filed Nov. 23, 2005, the disclosure of which is incorporated by reference herein.

TECHNICAL FIELD

The invention concerns a receiver of pulses of a signal of ultra wide band type and an associated method.

BACKGROUND

One technique for transmitting a stream of information at a high bit rate consists in using ultra wide band (UWB) pulse modulation whereby a sequence of pulses is sent one characteristic whereof (for example the amplitude, the time position or the phase of the pulses) forms a coded representation of the information to be transmitted. These pulses are transmitted with a predetermined average pulse repetition period (PRP).

A transmission system using these principles is described in the patent application EP 1 482 648, for example.

That document proposes, when electromagnetic signals are received, to transpose the analog signals received into the baseband by means of mixers before converting them into digital signals to be processed by means of samplers.

On this point, and in contrast, the patent application EP 1 298 811 proposes to sample the electromagnetic signal as soon as it is received, following simple processing by means of an input stage that is linear in frequency and essentially comprises a low-noise amplifier, with no demodulation processing of the signal in the frequency domain to transpose it into the baseband.

Although it avoids the presence of mixers, this solution involves sampling at a very high frequency in order to comply with the well known Nyquist criterion in order always to recover the whole of the signal in digital form for processing.

Because of this constraint, the use of this solution involving direct sampling of the signals has appeared inappropriate in the case of transmission of streams of information at a lower bit rate, for example from 1 kbps to 10 Mbps. The solution using mixers, as described in the patent application EP 1 482 648, very greatly reduces the sampling frequency used in this case.

Clock drift between two pulses is also a problem in the case of relatively low bit rates: with a standard clock, the shift between two pulses may lead to a loss of synchronization that prevents correct correlation of the signal. (For example, for a typical bit rate of 250 kbps, the duration separating two pulses is typically of the order of 4 µs, during which a standard clock with a slippage of 20 ppm drifts by 80 ps, whereas the correlation of a pulse with a center frequency $f_C$ equal to 4 GHz necessitates for synchronization an accuracy of the order of $1/(4f_C)$, i.e. 60 ps).

SUMMARY

Going against the received wisdom whereby the direct sampling solution is inappropriate for relatively low bit rates, the invention proposes a receiver of electromagnetic signals transmitted in a frequency band having a predetermined upper limit and representing a stream of information by means of a modulation of pulses at a predetermined average pulse repetition frequency, characterized by a n input stage receiving the signals from an antenna, comprising a band-pass filter and applying processing without changing frequency to said signals and a sampler of signals processed by the input stage with a sampling frequency that is an integer multiple of the average pulse repetition frequency and less than said upper limit.

Although the sampling frequency does not satisfy the Nyquist criterion and the sampled signal should therefore not enable total reconstruction of the received signal, the plurality of signals sampled in each average pulse repetition period enables the signal to be extracted from the noise.

The input stage may comprise a band-pass filter, which limits the signals transmitted to the sampler to those situated in the frequency band mentioned hereinabove.

The sampling frequency is less than one fifth of said upper limit, for example, and so is an order of magnitude lower than the Nyquist frequency, which significantly lightens the constraints compared to conventional systems using the Nyquist frequency.

Moreover, the sampling frequency is greater than twice the pass-band of the band-pass filter, for example.

The receiver may equally comprise selection means adapted to transmit a selected portion of the sampled signals to a correlation module, which limits the subsequent processing load.

The signals sampled during an average pulse repetition period are grouped into a predetermined number of segments, for example, and said selected portion of the sampled signals can then correspond to particular segments.

Means may then be provided for determining the selected segments on the basis of the presence of signals in the corresponding segments during a synchronization phase, which limits processing during the phase of receiving data to only those segments containing the pulsed signal.

In one practical embodiment, a correlation module is adapted to auto-correlate the sampled signals.

Moreover, to improve the signal to noise ratio, the correlation module may be configured to receive sampled signals from an integration module.

The correlation module is adapted to generate a result sampled on one bit, for example.

A decision module receives what is produced by the correlation module, for example. In one possible embodiment, a filter module is disposed between the correlation module and the decision module.

To reduce the complexity of the system, the sampler is adapted to sample the processed signals over a number of levels less than or equal to 4, for example.

The invention also proposes a method of receiving electromagnetic signals transmitted in a frequency band having a predetermined upper limit and representing a stream of information by means of a modulation of pulses at a predetermined average pulse repetition frequency, characterized in that it comprises a step of sampling signals received through an input stage comprising a band-pass filter applying processing without changing frequency (linear in frequency) to said signals at a sampling frequency that is an integer multiple of the average pulse repetition frequency and less than said upper limit.

Such methods may have optional features corresponding to those mentioned previously in connection with the receiver and therefore have the resulting advantages.

BRIEF DESCRIPTION OF THE DRAWING

Other features and advantages of the invention will become apparent in the course of the following description, which is given with reference to the appended figures, in which:

FIG. 4 is a schematic diagram illustrating a sender adapted to exchange data with the receiver of FIG. 1;

FIG. 5 is a diagrammatic illustration in accordance with an aspect of the invention showing various subdivisions of the sets of samples.

DETAILED DESCRIPTION

Figure 1:
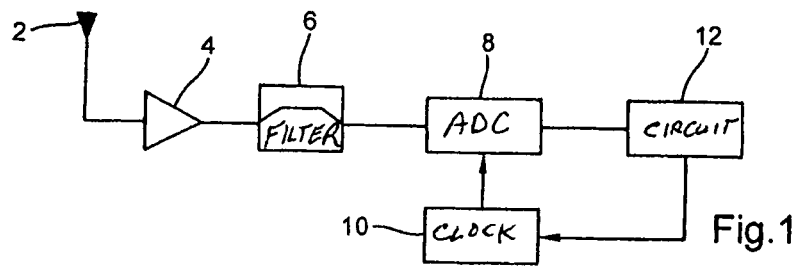
FIG. 1 is a schematic diagram illustrating the principal elements of a receiver according to an aspect of the invention.

FIG. 1 represents the principal elements of a receiver conforming to the teachings of the invention.

Such receivers are adapted to receive ultra wide band (UWB) signals formed by the repetition of a very brief amplitude-modulated pulse (generally having a duration less than a few nanoseconds, typically less than 2 ns), with an average pulse repetition period PRP that is relatively long, typically greater than 100 ns, and in any event greater than 2 ns. In the example described here, a PRP of 250 ns is used (which corresponds to a frequency $f_{PRP}$=4 MHz).

In such transmission systems, the very short duration of the pulse leads to very broad spectrum spreading of the signal up to very high frequencies: the energy is generally concentrated around a center frequency $f_C$ of the order of a few GHz (for example 4 GHz) with a bandwidth of the order of at least ½ GHz (for example 1 GHz), which yields a signal having a maximum frequency $f_{MAX}$ of the order of a few GigaHertz (generally greater than 4 GHz, here 4.5 GHz).

The receiver represented in FIG. 1 comprises an antenna 2 which receives the electromagnetic signals and forwards them to a low-noise amplifier 4. The amplified signals then pass through a band-pass filter 6 appropriate to the pulses to be received, i.e. with a center frequency $f_C$ equal to 4 GHz and a pass-band of 1 GHz.

The filtered signal is received by an analog-digital converter (ADC) 8 which, thanks in particular to a clock 10, operates at a sampling frequency $f_e$ that is a multiple of the average pulse repetition frequency $f_{PRP}$, that is to say $f_e=\alpha.f_{PRP}$, where $\alpha$ is an integer. Here, for example, $\alpha$=500 and thus $f_e$=2 GHz.

Note that the sampling frequency $f_e$ used in this way is lower than the Nyquist frequency $f_{Nyquist}$ that would be necessary for perfect reconstruction of the sampled signal, for which: $f_{Nyquist}=2.f_{MAX}$, i.e. 9 GHz here.

The analog-digital converter 8 thus transforms the received and filtered signal into a stream of digital samples at the frequency $f_e$. Each sample is coded on a predetermined number of bits, for example 1 bit, 1.5 bits (i.e. the three logic levels: −1, 0, +1), or a plurality of bits.

The stream of samples is transmitted to a digital processing circuit 12 whereof one embodiment is described next with reference to FIG. 2.

Figure 2:
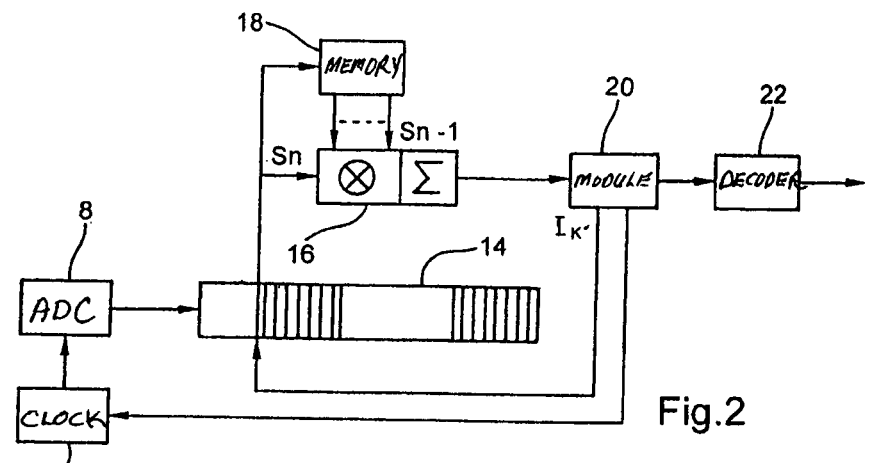
FIG. 2 is a schematic diagram illustrating a first embodiment of a processing circuit for the receiver of FIG. 1.

FIG. 2 represents one embodiment of a digital processing circuit of a receiver conforming to the teachings of the invention.

In FIG. 2, to clarify the explanation, the analog-digital converter 8 and the clock 10 already mentioned with reference to FIG. 1 are shown again.

The stream of digital samples generated by the analog-digital converter 8 is received in a module 14 adapted to select segments of samples as explained in detail hereinafter. This selection module 14 groups the samples into sets of n samples referred to hereinafter as "segments".

The ratio already mentioned between the sampling frequency $f_e$ and the average pulse repetition frequency in the received signal $f_{PRP}$ is chosen so that an average repetition period PRP corresponds to K segments, i.e.: $PRP=K.n.T_e$, where $T_e$ is the sampling period, equal to $1/f_e$. Because of this, in the above relationship, $\alpha$=K.n.

The number of samples in each segment can vary according to the application, for example from 1 to 400. Low values may be used if fine synchronization is required. Nevertheless, as a general rule, a number n of samples from 10 to 50 is used.

The selection module 14 sends the samples of the segments to a correlation module 16 and to a memory 18.

The memory 18 sends the correlation module 16 the n samples of the corresponding segment in the preceding symbol stored earlier.

Accordingly, the correlation means 16 compute the correlation product (or scalar product) of the samples of a given segment of a symbol $S_n$ and of the same segment of the preceding symbol $S_{n-1}$. Thus the signal is auto-correlated.

It will be noted here that each symbol is described by a predetermined number N of pulses received over the same number of average repetition periods PRP. If each symbol is described by one pulse (therefore present in only one repetition period PRP), the memory 18 sends the correlation means 16 the n samples of a segment with a delay equal to the average repetition period PRP. However, if each symbol is described by N pulses, the samples are stored for a period equal to N.PRP.

The correlation product result is sent to a decision module 20 which determines if a signal is present in the segment concerned as a function of the correlation product result for that segment.

Where appropriate and additional processing circuit may be disposed between the decision module 20 and the correlation means 16 to preprocess signals from the correlation means 16 for the purposes of the decision to be made in the module 20, as described with reference to FIG. 3.

When a signal is detected in a segment, the decision module 20 also indicates the value of the detected signal and sends it to a decoder (or demapper) 22 which deduces from it the information that was sent and submits it to later stages of the receiver for processing.

Such receivers operate in two phases: a first or synchronization phase and a second or data reception phase. For example, these two phases are executed during the transmission of a physical frame consisting of a series of pulses that defines both a preamble corresponding to the synchronization step and the data to be transmitted.

During the synchronization phase, the selection module 14 sends all the segments to the correlation module 16 and to the memory 18. Moreover, whatever the number N of pulses used to describe each symbol, the memory 18 generates a delay equal to the average repetition period PRP, and so each segment is correlated with the corresponding segment received during the preceding period PRP. In other words, if $k_i$ denotes a segment of index i, the correlation is effected during the synchronization phase between each segment $k_i$ and the corresponding segment in the preceding period: $k_{i-K}$.

To simplify the decision-making circuit, the output of the correlation module 16 may be quantized on one bit during this synchronization phase.

The decision module 20 thus receives the auto-correlation result for each segment in a period and thus determines a limited number K' of consecutive segments over which the greater portion of the energy of the signal extends, i.e. during which the pulse spread by the transmission channel was received.

Information $I_{K'}$ that indicates the K' segments concerned is then sent to the selection module 14 for use during reception of data as described next.

During the data reception phase, for each period PRP, the selection module sends the correlation module 16 and the memory 18 only the K' segments determined during the synchronization step just described.

The correlation means 16 then apply to these K' segments the processing already mentioned hereinabove, i.e. they compute the correlation product between each of the K' segments and the corresponding segment of the preceding symbol.

On the basis of the result for these K' correlation products, the decision module 20 can take a robust approach to deciding the value of the signal sent during the period PRP concerned, since it has been determined beforehand that this signal was present in those K' segments.

For example, it is possible to define a threshold level over the K correlation product results resulting from the synchronization phase for selecting K' segments from the total number K of segments and then to accumulate the K' correlation results resulting from the phase of sending the data corresponding to the selected K' segments, and finally to make a decision as to the sign of the total.

To improve performance it would be equally possible to weight each of the K' selected correlation product results from the phase of sending the data by the K' correlation product results from the synchronization phase before accumulating them and taking a decision as to the sign of the total.

Alternatively, instead of accumulating the K' correlation product results from the phase of sending data, K' individual decisions as to the sign of each of the K' total could be accumulated and the sign of the overall result deduced from the vectors of K' decisions (for example, the K' individual decisions are values from $\{-1; +1\}$ and the sign of the overall result is the sign of the sum of these K' individual decisions).

Finally, it may be noted that it is possible to permutate the blocks 20 and 26 during the phase of sending data in order greatly to reduce the complexity.

In this case, the K' correlation product results from the phase of sending data (whether weighted by the K' correlation product results from the synchronization phase or not) are accumulated to supply a single value to the L decoding module 26 at the frequency 1/(N*PRP).

Figure 3:
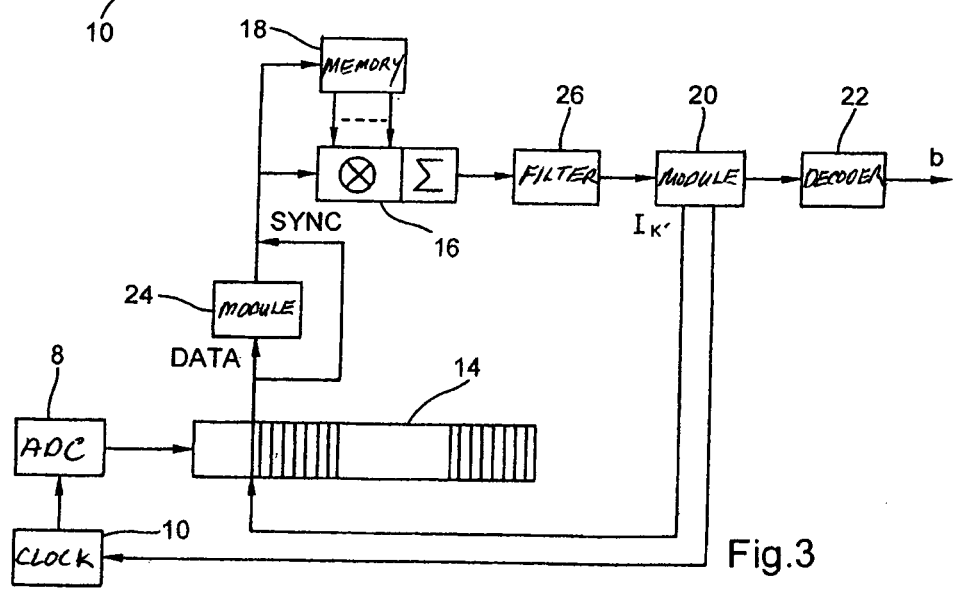
FIG. 3 is a schematic diagram illustrating a second embodiment of a processing circuit for the receiver of FIG. 1.

FIG. 3 represents a second embodiment of the processing circuit 12 of a receiver conforming to the teachings of the invention.

Elements identical to those of the preceding embodiment of the circuit described with reference to FIG. 2 retain the same references and will not be described again.

In this embodiment, an integration module 24 is disposed between the selection module 14 and the correlation module 16. During the phase of receiving data, the integration module 24 accumulates the corresponding samples in the N periods PRP as described hereinafter.

The integration module 24 is therefore of particular benefit when the symbols are described by a number N of pulses strictly greater than 1.

It may be noted here that the integration module 24 is preferably bypassed during the synchronization phase (the object of which is to determine the segments containing the pulse during a given period PRP, whereas the integration module 24 is aiming, during the reception of data, to increase the signal to noise ratio and the sensitivity of the samples by integration of the signal measured at a given time over a plurality of successive periods PRP).

The circuit represented in FIG. 3 further comprises a filter module 26 between the correlation module 16 and the decision module 20 appropriate to the code that is used to transform the correlation product results from the correlation module into a signal that is easily identifiable by the decision module 20, as explained below.

The operation of the FIG. 3 circuit is described in more detail next on the basis of an example of sending data following coding of the signals by the sender represented in FIG. 4.

In the sender represented in FIG. 4, a stream of information made up of bits b is applied to the input of an L coder 30 which codes the information with a yield 1/L and applies the L coded stream to the input of a differential coder 32.

The L coder 30 may be of various types, for example one that provides L repetitions of the bit received at the input. Polarity coding may also be applied to the L repetitions in the L coder.

Alternatively, an L coder is not used (i.e. L=1) and the stream of binary information b is therefore applied directly to the input of the differential coder 32.

As already mentioned, in the sender represented in FIG. 4 the L coded stream of information generated by the L coder 30 is applied to the input of the differential coder 32 which converts the stream of information received into a stream of binary information any polarity variation whereof depends on the value of the bit in the stream received. Accordingly, in one possible example, a bit of value −1 in the bit stream before differential coding implies a change of state in the stream coded by the differential coder 32 whereas a bit of value +1 in the bit stream before differential coding implies no change to the binary value in the stream coded by the differential coder 32.

The bit stream after differential coding is applied to an N coder 34 which codes with a yield of 1/N, for example N repetitions of the value received at the input. (A solution without such a coder may also be used, which amounts to considering the case N=1.)

Finally, consideration may be given to further applying a technique of the "Time Hopping" type (this is the usual name for position coding by pseudo-random time hopping).

The stream of information generated by the N coder 34 is applied to the input of a pulse generator 36 which sends pulses at the frequency $f_{PRP}$ the polarity whereof is determined by the input bit stream.

A numerical example that explains clearly how the sender circuit from FIG. 4 works follows, in which L=2 and N=3:
sequence of four information bits b: 0 1 1 1;
NRZI coding transforming O to −1 and 1 to +1;
after L coding of type +1 −1, there is obtained at the output of the coder 30 the sequence: −1 +1 +1 −1 +1 −1 +1 −1;
after differential coding in the differential coder 32, there is obtained the sequence (considering that the initial value or empty information has the value +1): +1 −1 −1 −1 +1 +1 −1 −1 +1;
after coding by the N coder 34 (here repetition coding), the pulses generated with a polarity that depends on the input sequence received are therefore as follows: +1 +1 +1 −1 −1 −1 −1 −1 −1 −1 −1 +1 +1 +1 +1 +1 +1 −1 −1 −1 −1 −1 +1 +1 +1.

The reception of such signals by the receiver shown in FIG. 3 is described next, the principal components of which receiver have been described hereinabove.

As already mentioned with reference to FIG. 2, physical frames are sent comprising a preamble for synchronizing the receiver and then the information data to be transmitted (generally separated from the preamble by a delimiter).

A postamble could also be transmitted to enable resynchronization of the send and receive clocks, for example.

The sending of a frame therefore begins with a synchronization phase, as already indicated with reference to FIG. 2.

During this synchronization phase, after filtering by the band-pass filter 6, the received signal at the frequency $f_e$ is sampled by means of the analog-digital converter 8. As already mentioned, the sampling frequency $f_e$ is equal to $K.n.f_{PRP}$, and the output bit stream of the converter 8 can therefore be divided into K consecutive segments of n samples by the selection module 14, which transmits each of these segments of n samples directly to the correlation module 16 and to the memory 18, thus bypassing the integration module 24, as indicated by the arrow SYNC in FIG. 3.

For the N pulses describing a symbol, each segment of n samples is then correlated in the correlation module 16 with the corresponding segment received during the preceding period PRP (i.e. with the n samples received earlier, by a time equal to the duration PRP).

This amounts in practice to sending a synchronization sequence of S symbols, i.e. sending a known sequence of M'=S×N×L pulses that it will be necessary to identify. Thus on sending there is retranscription by software into a single sequence of length M' of the known sequence of symbols constituting the preamble coded by the N coder, then by the differential coder and then by the L coder; this retranscribed sequence is supplied to the module 26 as described hereinafter, the L decoding module 26 operating in a "synchronization" mode in order to be able to decode a known sequence over M' pulses.

The stream sent by the correlation module 16 is therefore a stream of information consisting of an autocorrelated value for each of the K segments of each period PRP (the numerical values sent to the output of the correlation module therefore have a frequency of $K.f_{PRP}$).

As already seen, the output stream of the correlation module 16 is applied to the input of a filter module 26 appropriate to the form of L coding used in the transmission system previously described. The filtered stream sent to the output of the filter module 26 is applied to the input of the decision module 20, the function whereof during this synchronization phase is to determine the presence of a signal in each of the segments, for example by virtue of the values relating to the segment concerned exceeding a threshold (which in the case of L coding may be defined by a percentage of the value L).

As a general rule, and in particular because of the spreading by the channel, the signal (i.e. the pulse) is spread over a plurality of consecutive segments. During the synchronization phase, the decision module 20 therefore determines which consecutive segments contain a significant portion of the energy and sends information $I_{K'}$ that designates those particular K' segments to the selection module 14.

Once the synchronization phase has been effected using the preamble of the received physical frame, the information signals transmitted may be received as follows.

As previously, the electromagnetic signals received by the antenna and filtered by the band-pass filter 6 are sampled at the frequency $f_e$ and then sent to the selection module 14, which divides this stream of information at the frequency $f_e$ into K segments of n samples using synchronization information supplied by the decision module 20 that indicates the time of arrival of the first item of data.

In these K segments, the selection module 14 sends its output (here to the integration module 24, as shown by the arrow DATA in FIG. 3) only the samples relating to the K' segments indicated as containing the essential portion of the signal by the decision module 20 at the time of the synchronization step described above.

In this phase of receiving transmitted information, the segments of n samples are sent to the integration module 24 which adds the n samples of a given segment one by one in each of n periods PRP (the summed values being identical a priori thanks to the N coding mentioned above, which increases the signal to noise ratio of the system).

Following sample by sample summation of the N segments in the integration module 24, each segment (which is still made up of n samples each of which represents the integration of N samples) is transmitted to the correlation module 16 and to the memory 18 in order to effect auto-correlation of the signal as already indicated with reference to FIG. 2.

It may be noted here that auto-correlation (i.e. in practice correlation of a received pulse with the preceding pulse) intrinsically effects the decoding associated with differential coding. The use of differential coding by the differential coder 32 at the time of sending is in fact particularly well suited to the autocorrelated receiver described here.

The auto-correlation results from the module 16 are then sent to the filter module 26. In an advantageous embodiment, the correlation module is adapted to accumulate the auto-correlation results of the K' segments into a single item of information sent to the filter module 26. The filter module 26 therefore carries out the L decoding of the stream of values that it receives and sends the decoding result to the decision module 20, which in turn sends the information to the decoder (or demapper) 22, which transforms the streams of values that it receives into a stream of binary information corresponding to the information bits b sent by the FIG. 4 sender.

Returning to the preceding example, on the basis of the pulses sent, when transmission conditions are good, as indicated above:

the following sequence is obtained after integration in the integration module 24: +1 −1 −1 −1 +1 +1 −1 −1 +1;

because of the differential auto-correlation (which amounts to obtaining the product of two successive symbols), the following sequence is then obtained at the output of the correlation module 16: −1 +1 +1 −1 +1 −1 +1 −1;

this sequence yields, via the L decoder of the filter module 26, the sequence: −1 +1 +1 +1;

this sequence is transformed by the decoder 22 into the series of bits: 0 1 1 1, which indeed corresponds to the initial sequence of four information bits.

Figure 6:
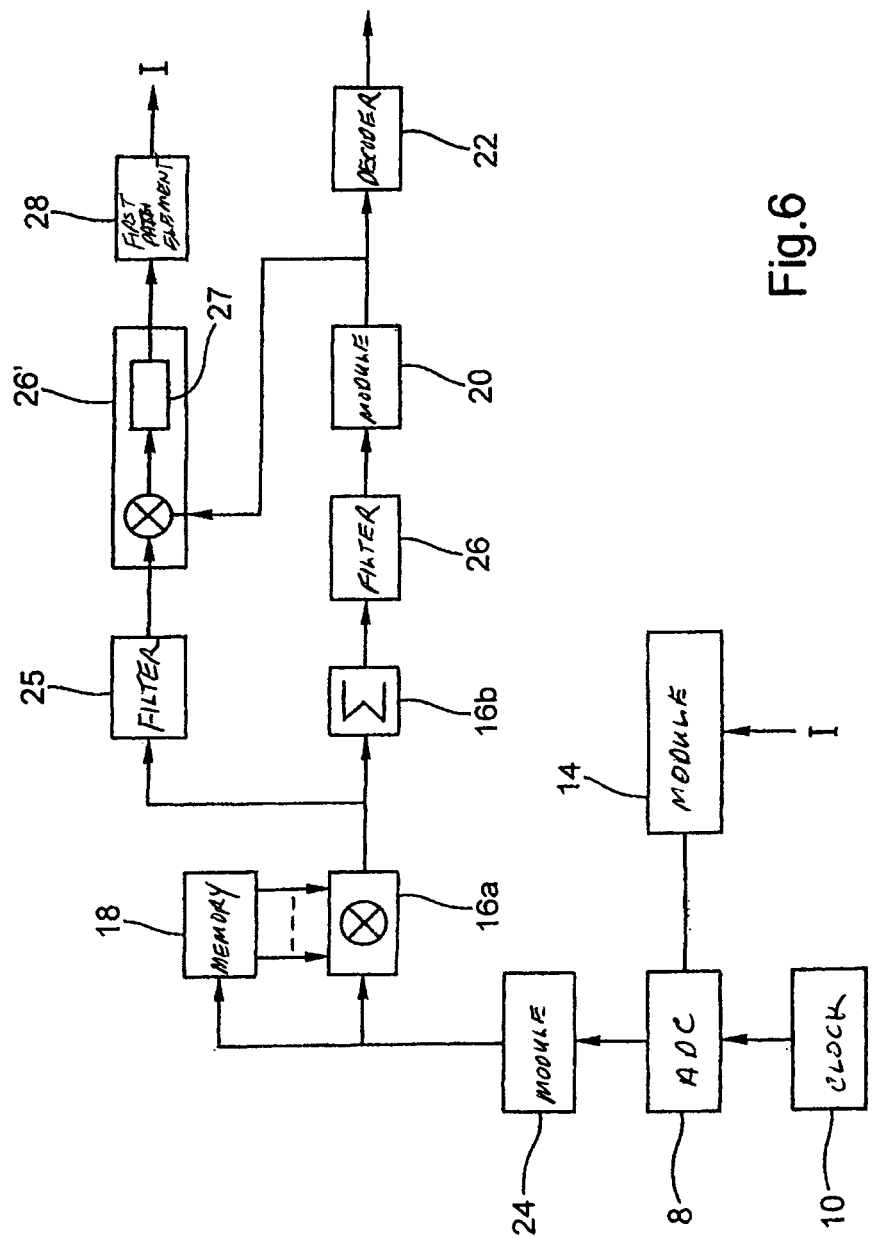
FIG. 6 is a schematic diagram illustrating a third embodiment of the invention.

In a variant represented in FIG. 6, the arrival time may equally be estimated in parallel with the sending of data from the pulses used to send data in order to refine the estimate of the arrival time: adaptation of the module 26 is then required, which is a kind of decoder the code whereof is derived from the knowledge of the received data.

In this case, since the arrival time is estimated from the data in parallel with its reception, the circuit must be connected in parallel to estimate the arrival time. An example of a dedicated circuit making a decision based on the arrival time estimated in parallel with the reception of the data is represented in FIG. 6:

Compared to the preceding examples, the block 16 is divided in two portions: the multipliers 16a and the summer 16b. A number K" consecutive segments of n samples selected after the synchronization phase are used (typically K"=2).

The output of the multipliers 16a, in other words n*K" samples (in which the first path will be searched for) is supplied to a first path search module, and more precisely to a finite impulse response type low-pass digital filter 25, where applicable a decimator filter. Its function is to "smooth" the signal to improve the immunity of this module to clock drift.

The depth $N_{coef}$ of this filter 25 is very low, which makes the complexity of this block very low ($n_{coef}$ is typically from 2 to 4). One example of this filter is a sliding average of four coefficients set at 0.5 for a standardized gain, i.e. Filter=[0.5 0.5 0.5 0.5].

The decimation factor $f_{dec}$ is typically equal either to 1 (no decimation) or to $n_{coef}$:
- if $f_{dec}$=1, this amounts to effecting a sliding average at the output of the multipliers (16a),
- if $f_{dec}$=$n_{coef}$, this amounts to splitting the segment of n*K" samples into M*K" sub-segments of $n_{coef}$ samples (M=n/$n_{coef}$).

The first option in respect of the value of $f_{dec}$ ($f_{dec}$=1) represents an improvement in accuracy whereas the second ($f_{dec}$=$n_{coef}$) represents an improvement in complexity.

The n*K samples selected are weighted by the output of the block 20 to be accumulated again at the frequency $f_{PRP}$/(N*L). When the number of accumulations necessary for correct detection of the first path has been reached, a decision is taken on the cumulative results to give the fine information I for the position of the first path.

Note further that, for all the embodiments considered, the use of segments each made up of n samples enables integration of the signals over each interval of duration n.$T_e$, which avoids clock drift problems by correctly dimensioning n and thus uses a clock 10 of moderate cost.

Moreover, estimation of the coarse arrival time (synchronization) or fine arrival time (arrival time estimation) may enable detection of relative slippage of the clocks between the sender and the receiver.

To measure this slippage, the perceived duration between two arrival times (for example between two successive frames or between two sequences of pulses coded in the same frame) may be measured and that measurement compared with the time expected a priori between these two arrival times. This measurement of the relative slippage of the receiver clock relative to the sender clock can enable one clock to be slaved to the other, accelerating or slowing it down in order to reduce this slippage, as represented diagrammatically by means of the arrow pointing to the clock 10 in the figures.

The invention is not limited to the embodiments thereof that have just been described.

The invention claimed is:

1. A receiver of electromagnetic signals, where each signal is transmitted with a corresponding frequency in a frequency band having a predetermined upper limit ($f_{MAX}$) and representing a stream of information by means of a modulation of pulses at a predetermined average pulse repetition frequency ($f_{PRP}$) using differential coding, the receiver comprising:
   an input stage receiving the signals from an antenna, the input stage comprising a band-pass filter transmitting signals limited to the frequency band, the input stage applying processing without changing the frequency of the transmitted signals; and
   a sampler of the signals processed by the input stage, wherein the sampler applies a sampling frequency ($f_e$) that is an integer multiple of the average pulse repetition frequency ($f_{PRP}$) and less than the upper limit of the frequency band ($f_{MAX}$), and
   wherein differential decoding of the signals comprises using a correlation module that is coupled to the sampler and auto-correlates the signals using a coupled memory that stores grouped samples from a preceding average pulse repetition period, where the integer is directly related to a number of the grouped samples.

2. The receiver according to claim 1, wherein the sampling frequency ($f_e$) is greater than or equal to twice a pass-band of the band-pass filter.

3. The receiver according to claim 1, wherein the sampling frequency ($f_e$) is less than one fifth of said upper limit of the frequency band ($f_{MAX}$).

4. The receiver according to claim 1 further comprising a selection module that transmits a selected portion of the sampled signals to the correlation module.

5. The receiver according to claim 1, wherein the correlation module is coupled to the sampler through an integration module, and wherein the correlation module receives sampled signals from the integration module.

6. The receiver according to claim 1 further comprising a decision module that receives output from the correlation module.

7. The receiver according to claim 6 further comprising an L coding filter module between the correlation module and the decision module.

8. The receiver according to claim 1, wherein the correlation module generates a result sampled on one bit.

9. The receiver according to claim 1, wherein the sampler samples the processed signals over a number of signal levels less than or equal to 4 signal levels.

10. The receiver according to claim 1, wherein the transmitted electromagnetic signals comprise ultra wide band type signals.

11. A receiver of electromagnetic signals transmitted in a frequency band having a predetermined upper limit ($f_{MAX}$) and representing a stream of information by means of a modulation of pulses at a predetermined average pulse repetition frequency ($f_{PRP}$), the receiver comprising:
   an input stage receiving the signals from an antenna, the input stage comprising a band-pass filter transmitting signals limited to the frequency band, the input stage applying processing without changing a frequency of the signals;
   a sampler of the signals processed by the input stage, wherein the sampler applies a sampling frequency ($f_e$) that is an integer multiple of the average pulse repetition frequency ($f_{PRP}$) and less than the upper limit of the frequency band ($f_{MAX}$); and
   a correlation module and a selection module that transmits a selected portion of the sampled signals to the correlation module,
   wherein the signals sampled during an average pulse repetition period are grouped into a predetermined number of segments, and wherein the selected portion of the sampled signals corresponds to particular segments where the integer is directly related to the predetermined number of segments.

12. The receiver according to claim 11 further comprising means for determining the selected portion on the basis of the presence of the signals in corresponding segments during a synchronization phase.

13. The receiver according to claim 11, wherein the modulation uses differential coding and wherein the differential decoding of the signals comprises using the correlation module, the correlation module auto-correlating the signals.

14. A method of receiving electromagnetic signals where each signal is transmitted with a corresponding frequency in a frequency band having a predetermined upper limit ($f_{MAX}$) and representing a stream of information by means of a modulation of pulses at a predetermined average pulse repetition frequency ($f_{PRP}$) using differential decoding, the method comprising:

sampling signals received through an input stage comprising a band-pass filter transmitting signals limited to the frequency band;

selecting a portion of the sampled signals for transmission to a correlation module and auto-correlating the sampled signals using a memory that stores grouped samples from a preceding average pulse repetition period, wherein the differential decoding of the signals comprises using the correlation module;

applying processing without changing the frequency of the transmitted signals; and applying a sampling frequency that is an integer multiple of the average pulse repetition frequency ($f_{PRP}$) and less than the upper limit ($f_{MAX}$) of the frequency band, where the integer is directly related to the portion of sampled signals.

15. The method according to claim 14, wherein the sampling frequency ($f_e$) is greater than or equal to twice a passband of the band-pass filter.

16. The method according to claim 14, wherein the sampling frequency is less than one fifth of the upper limit of the frequency band.

17. The method according to claim 14 further comprising integrating the sampled signals before the auto-correlating the sampled signals.

18. A method of receiving electromagnetic signals transmitted in a frequency band having a predetermined upper limit ($f_{MAX}$) and representing a stream of information by means of a modulation of pulses at a predetermined average pulse repetition frequency ($f_{PRP}$), the method comprising:

sampling signals received through an input stage comprising a band-pass filter transmitting signals limited to the frequency band;

applying processing without changing a frequency of the signals;

applying a sampling frequency that is an integer multiple of the average pulse repetition frequency ($f_{PRP}$) and less than the upper limit ($f_{MAX}$) of the frequency band;

selecting a portion of the sampled signals for transmission to a correlation module; and grouping the signals sampled during an average pulse repetition period into a predetermined number of segments, wherein selecting a portion of the sampled signals comprises selecting particular segments and where the integer is directly related to the portion of sampled signals.

19. The method according to claim 18 further comprising determining the selected particular segments on the basis of the presence of the signals in the corresponding segments during a synchronization phase.

20. The method according to claim 18, wherein the modulation uses differential coding and wherein the differential decoding of the signals comprises using the correlation module, the correlation module auto-correlating the signals.

* * * * *